United States Patent
Bullister et al.

(10) Patent No.: US 9,829,324 B2
(45) Date of Patent: Nov. 28, 2017

(54) ENGINE BLOCK HEATER FAILURE DETECTION

(71) Applicant: Ford Global Technologies, LLC, Dearborn, MI (US)

(72) Inventors: Kevin Michael Bullister, Dexter, MI (US); Brandon Leroy Johnson, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 246 days.

(21) Appl. No.: 14/547,432

(22) Filed: Nov. 19, 2014

(65) Prior Publication Data

US 2016/0138502 A1    May 19, 2016

(51) Int. Cl.
| | |
|---|---|
| *F02D 41/06* | (2006.01) |
| *G01C 21/26* | (2006.01) |
| *G07C 5/00* | (2006.01) |
| *F02N 19/04* | (2010.01) |
| *F02D 41/26* | (2006.01) |
| *B60L 11/00* | (2006.01) |

(52) U.S. Cl.
CPC ............ *G01C 21/265* (2013.01); *B60L 11/00* (2013.01); *G07C 5/006* (2013.01); *G07C 5/008* (2013.01); *F02N 19/04* (2013.01)

(58) Field of Classification Search
CPC ......... F02D 41/06; F02D 41/26; G01C 21/26; G01C 21/265; G07C 5/00; G07C 5/006; F02N 19/04

USPC ........ 701/101, 114; 123/41.14, 41.33, 41.52, 123/697, 543, 545, 549, 553, 179.21, 123/142.5 R, 196 AB

See application file for complete search history.

(56) References Cited

U.S. PATENT DOCUMENTS

| | | | | |
|---|---|---|---|---|
| 3,877,639 | A * | 4/1975 | Wilson | B60H 1/032 236/46 R |
| 5,285,963 | A * | 2/1994 | Wakefield | B60H 1/0025 123/142.5 R |
| 5,791,407 | A * | 8/1998 | Hammons | B60H 1/034 123/142.5 E |
| 6,225,893 | B1 * | 5/2001 | Caissie | G08B 21/24 219/202 |
| 7,077,224 | B2 * | 7/2006 | Tomatsuri | B60K 3/00 123/142.5 R |
| 7,258,092 | B2 * | 8/2007 | Beaucaire | F02D 41/20 123/142.5 E |
| 7,277,791 | B2 * | 10/2007 | Petrosius | F02D 41/06 123/142.5 E |

(Continued)

OTHER PUBLICATIONS

NFPA 20: Stationary Fire Pumps Handbook, 2013 Edition, www.nfpa.org/catalog/product, 2 pages.

*Primary Examiner* — Thomas Moulis
*Assistant Examiner* — John Bailey
(74) *Attorney, Agent, or Firm* — Frank A. MacKenzie; Bejin Bieneman PLC

(57) ABSTRACT

A vehicle system includes a sensor that measures an engine block heating characteristic associated with an engine block heater. A processing device is programmed to determine an operating state of the engine block heater based on the engine block heating characteristic measured. A communication device is programmed to transmit a message that includes the operating state of the engine block heater.

20 Claims, 2 Drawing Sheets

(56) References Cited

U.S. PATENT DOCUMENTS

| | | | |
|---|---|---|---|
| 7,757,649 B2* | 7/2010 | Wakahara | F02D 35/025 123/142.5 E |
| 7,873,464 B2* | 1/2011 | Shartzer | F02D 41/062 123/435 |
| 7,975,536 B2* | 7/2011 | Bommer | F02D 41/222 73/114.68 |
| 8,140,246 B1* | 3/2012 | Manchanda | F01P 11/16 123/41.15 |
| 8,151,753 B2* | 4/2012 | Kamiyama | B60H 1/00314 123/142.5 E |
| 8,410,401 B2* | 4/2013 | Thomas | B60L 1/12 219/202 |
| 8,933,372 B2* | 1/2015 | King | F02N 19/10 123/142.5 R |
| 8,978,598 B2* | 3/2015 | Iwai | F01P 11/16 123/41.15 |
| 2002/0011221 A1* | 1/2002 | Suzuki | B60H 1/00492 123/41.14 |
| 2002/0170780 A1* | 11/2002 | O'Brien | F04B 39/0246 184/6.18 |
| 2007/0084427 A1* | 4/2007 | Petrosius | F02D 41/06 123/142.5 E |
| 2008/0300774 A1* | 12/2008 | Wakahara | F02D 35/025 701/113 |
| 2009/0015203 A1* | 1/2009 | Oakes | G06Q 40/00 320/132 |
| 2009/0182489 A1* | 7/2009 | Yang | F02D 41/062 701/113 |
| 2010/0176111 A1* | 7/2010 | Neisen | B60L 1/10 219/205 |
| 2012/0055663 A1* | 3/2012 | Onozawa | H05B 1/0236 165/266 |
| 2012/0256763 A1* | 10/2012 | Johnson | G08C 17/02 340/870.07 |
| 2012/0318214 A1* | 12/2012 | Iwai | F01P 11/16 123/41.15 |
| 2013/0035840 A1* | 2/2013 | Holbert | F02N 11/08 701/103 |
| 2013/0061621 A1* | 3/2013 | Nielsen | B60H 1/00257 62/236 |
| 2015/0094877 A1* | 4/2015 | Tahnoose | G07C 5/008 701/1 |
| 2015/0159615 A1* | 6/2015 | Van Wiemeersch | F02N 11/0807 701/113 |
| 2015/0183435 A1* | 7/2015 | Johnson | F02N 19/10 701/112 |

* cited by examiner

ENGINE BLOCK HEATER FAILURE DETECTION

BACKGROUND

Engine block heaters typically have a heating element that generates heat when plugged into a power source, such as an AC electrical outlet. The heating element heat the engine coolant, which in turn warms the engine block, to prevent coolant or engine oil from freezing in extremely cold temperatures. Keeping the coolant and engine oil from freezing increases the likelihood that the engine can be started in frigid temperatures.

DETAILED DESCRIPTION

While helpful, engine block heaters can be susceptible to certain failures. For example, power loss can prevent the engine block heater from keeping the coolant or engine oil from freezing. Power loss can result from weather conditions that, e.g., knock down power lines or vandalism—someone unplugging the engine block heater from the power source. Alternatively, the heating element may simply reach the end of its life and not work anymore. Because using an engine block heater suggests that the owner of the vehicle does not intend to use the vehicle for some amount of time, a failure may go undetected for several hours or days, which may be enough time for the coolant or engine oil to freeze.

One solution is to warn vehicle owners when an engine block heater has failed. An example system includes a sensor that measures an engine block heating characteristic. An example characteristic may include engine oil temperature, whether the engine block heater is receiving power from a power source, an engine block temperature, engine coolant temperature, etc. The engine block heating characteristic may be detected by a dedicated sensor or set of sensors, a shared set of sensors, or from a vehicle electronic control unit. A processing device is programmed to determine an operating state of the engine block heater—i.e., whether the engine block heater is working properly—based on the engine block heating characteristic measured. A communication device is programmed to transmit a message that includes the operating state of the engine block heater. The message, therefore, may communicate to the vehicle owner that the engine block heater has failed. With such a system, a vehicle owner may be immediately notified of a failed engine block heater and given sufficient time to take action before the engine coolant or oil freezes.

The elements shown may take many different forms and include multiple and/or alternate components and facilities. The example components illustrated are not intended to be limiting. Indeed, additional or alternative components and/or implementations may be used.

Figure 1:
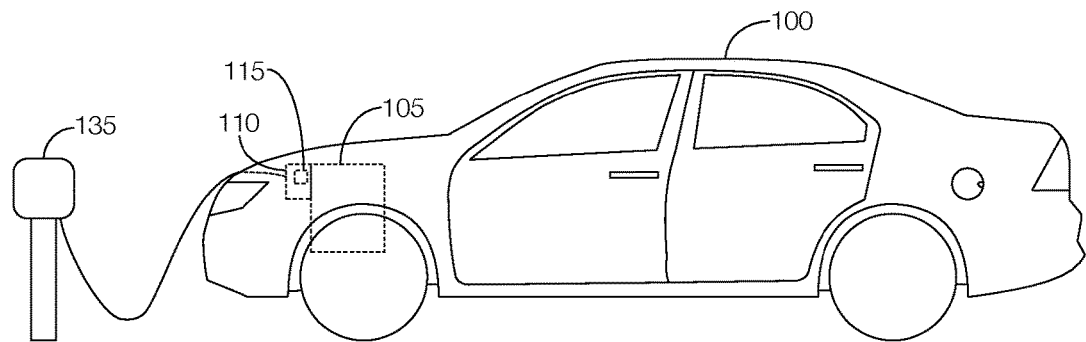
FIG. 1 illustrates an example vehicle with an engine block heater having a system for detecting engine block heater failures.

As illustrated in FIG. 1, the vehicle 100 includes an engine 105, a block heater 110, and a heater failure detection system 115. Although illustrated as a sedan, the vehicle 100 may include any passenger or commercial automobile such as a car, a truck, a sport utility vehicle, a crossover vehicle, a van, a minivan, a taxi, a bus, etc. In some possible approaches, the vehicle 100 is an autonomous vehicle configured to operate in an autonomous (e.g., driverless) mode, a partially autonomous mode, and/or a non-autonomous mode.

The engine 105 may be configured to convert a fuel source into motion that provides a torque to propel the vehicle 100. For example, the engine 105 may include an internal combustion engine. Certain parts of the engine 105 may be contained with an engine block. The engine block may house cylinders, cylinder heads, etc. Moreover, the engine block may define internal passages that allow engine coolant to flow throughout the engine 105. Coolant flowing through the passages may, e.g., cool the engine 105. Other passages may allow engine oil to flow from an oil pan and into the engine block to, e.g., lubricate moving parts of the engine 105.

The block heater 110 may be configured to heat the engine 105 when the engine 105 is not running. The block heater 110 may include a resistive heating element that generates heat when plugged into a power source 135. In other words, the resistive heating element may convert electrical energy into heat. The block heater 110 may be located on or near the engine block or oil pan. Heat generated by the block heater 110 may, therefore, heat the engine block, oil pan, engine coolant, engine oil, or the like.

The heater failure detection system 115 may be configured to detect failures that could prevent the block heater 110 from keeping the engine 105 from freezing. For instance, the heater failure detection system 115 may be configured to measure a characteristic associated with the block heater 110. Examples of characteristics may include engine oil temperature, whether the block heater 110 is receiving power from the power source 135, an engine block temperature, engine coolant temperature, etc. The engine block heating characteristic may be detected by a dedicated sensor or set of sensors, a shared set of sensors, or from a vehicle electronic control unit. The heater failure detection system 115 may be further configured to determine an operating state of the block heater 110. The operating state may include, e.g., whether the engine block heater 110 is working properly. The operating state may be determined from the measured characteristic.

Further, depending on the operating state, the heater failure detection system 115 may transmit a message that indicates the operating state. The message may further identify the vehicle 100 by, e.g., the vehicle identification number or another identifier, the location of the vehicle 100, or both. The message may be transmitted to an owner of the vehicle 100. Thus, if the block heater 110 is unable to sufficiently heat the engine 105 or components of the engine 105, the owner will be promptly notified. By including identification and location information in the message, the vehicle 100 may be quickly identified and located, which is helpful for monitoring a fleet of vehicles 100 with block heaters 110. The heater failure detection system 115 may be configured by the vehicle owner to transmit particular messages in response to particular conditions.

Figure 2:
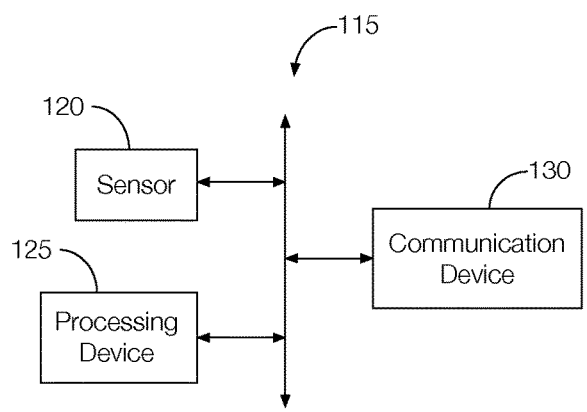
FIG. 2 is a block diagram of an example system used in the vehicle of FIG. 1.

FIG. 2 is a block diagram of an example heater failure detection system 115. As shown, the heater failure detection system 115 includes a sensor 120, a processing device 125, and a communication device 130.

The sensor 120 may be configured to measure an engine block heating characteristic and output a signal representing the measured characteristic. Example sensors 120 may include an oil temperature sensor, a coolant temperature sensor, a power sensor (i.e., a sensor 120 that determines whether a device such as the block heater 110 is receiving electrical power), an engine block temperature sensor, or the like. As discussed above, the engine block heating characteristic may be detected by a dedicated sensor or set of sensors, a shared set of sensors, or from a vehicle electronic control unit.

The processing device 125 may be programmed to receive signals output by the sensor 120 and determine the operating state of the block heater 110 from the received signals. The signals output by the sensor 120 may represent the measured engine block heating characteristic. From such signals, including how the signals change over time, the processing device 125 may be programmed to determine whether the engine block heater 110 is working properly. For instance, the processing device 125 may determine whether the coolant, oil, or engine block temperature is increasing, decreasing, or remaining constant. If increasing or remaining constant, the processing device 125 may be programmed to determine that the block heater 110 is working properly. If the temperature of those engine components is unexpectedly decreasing, however, the processing device 125 may be programmed to determine that the block heater 110 is not working properly. Moreover, the signal output by the sensor 120 may indicate that the block heater 110 has lost power. The processing device 125 may be programmed to determine that the block heater 110 is not working properly in response to receiving such as signal.

The communication device 130 may be programmed to generate and transmit messages that include the operating state of the block heater 110. The message may be transmitted wirelessly to, e.g., the owner or manager of the vehicle 100. In some instances, such as where the vehicle 100 is part of a fleet, the message may include a vehicle identifier, such as a vehicle identification number, and a location. The location may include GPS coordinates, a map, a parking space identification, etc. The communication device 130 may be configured by the vehicle owner to transmit particular messages in response to particular conditions. For instance, the communication device 130 may be programmed to transmit the message to, e.g., a particular person's mobile device, to a particular email address, etc. Moreover, the communication device 130 may be programmed to include particular information, such as the vehicle identifier and vehicle location, as well as the particular conditions under which the communication device 130 will transmit the message. Such conditions may include, e.g., power failures, component failures, or the like. The communication device 130 may be programmed to generate and transmit messages in accordance with any number of telecommunications protocols such as the Short Message Service (SMS) protocol, WiFi, Bluetooth®, the Code Division Multiple Access (CDMA) protocol, the Time Division Multiple Access (TDMA) protocol, or the like. In instances where the engine block heating characteristic is determined from a vehicle electronic control unit, the communication device 130 may be programmed to access sensor data from the electronic control unit.

Figure 3:
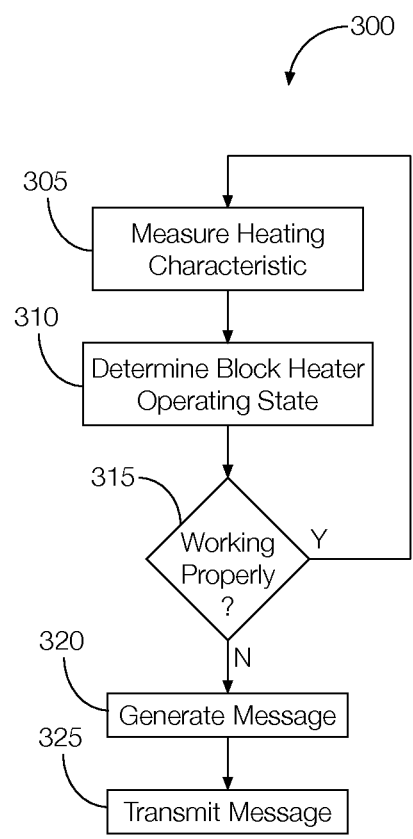
FIG. 3 is a flowchart of an example process that may be executed by the system of FIG. 2 to detect a failure in the engine block heater.

FIG. 3 is a flowchart of an example process 300 that may be executed by the heater failure detection system 115. The process 300 may be initiated when the block heater 110 is turned on. In some instances, the process 300 may be initiated any time the vehicle 100 is not in use and the external temperature drops below a predetermined threshold.

At block 305, the sensor 120 may measure the engine block heating characteristic. Examples of engine block heating characteristics may include engine oil temperature, whether the block heater 110 is receiving power from a power source 135, an engine block temperature, engine coolant temperature, etc. The sensor 120 may output a signal representing the measured characteristic.

At block 310, the processing device 125 may determine the operating state of the block heater 110. The operating state may be determined from the signal generated by the sensor 120 at block 305. The operating state may indicate whether the block heater 110 is working properly. In some possible approaches, the operating state may be determined from multiple characteristics or the way certain characteristics change over time. For example, a decrease in oil temperature, the engine block temperature, or the coolant temperature may indicate that the block heater 110 has malfunctioned. Alternatively or in addition, a loss of power may indicate that the block heater 110 is not functioning to keep the engine 105 warm.

At decision block 315, the processing device 125 may determine whether the block heater 110 is working properly. If so, the process 300 may continue at block 305. If the processing device 125 determines that the block heater 110 is not working properly, the process 300 may continue at block 320.

At block 320, the communication device 130 may generate a message. The message may represent the operating state, including that the block heater 110 is not working properly. In some instances, the message may identify the failure of the block heater 110. For instance, the message may indicate that the block heater 110 has lost power. Moreover, the message may include other information include a vehicle identifier, the vehicle location, or both.

At block 325, the communication device 130 may wirelessly transmit the message. The message may be transmitted according to a wireless communication protocol. The process 300 may end after block 325 and may be initiated again after the block heater 110 is repaired or the power source 135 is reconnected.

With the process 300, an owner of a vehicle 100 may be notified when the block heater 110 is unable to heat the engine 105. Moreover, by communicating a vehicle identifier or vehicle location, a manager of a fleet of vehicles 100 may quickly determine which block heater 110 has failed.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   a sensor configured to measure an engine block heating characteristic, associated with an engine block heater, while a vehicle engine is not running;
   a processing device programmed to determine an operating state of the engine block heater based on the engine block heating characteristic measured; and
   a communication device programmed to transmit, while the vehicle engine is not running, a message including the operating state of the engine block heater.

2. The vehicle system of claim 1, wherein the engine block heating characteristic includes an engine oil temperature.

3. The vehicle system of claim 1, wherein the engine block heating characteristic indicates that the engine block heater is not receiving power from a power source.

4. The vehicle system of claim 1, wherein the engine block heating characteristic includes an engine block temperature.

5. The vehicle system of claim 1, wherein the engine block heating characteristic includes an engine coolant temperature.

6. The vehicle system of claim 1, wherein the processing device is programmed to determine the operating state of the engine block heater based on a plurality of engine block heating characteristics.

7. The vehicle system of claim 1, wherein the processing device is programmed to determine the operating state of the engine block heater based on how the engine block heating characteristic changes over time.

8. The vehicle system of claim 1, wherein the communication device is configured to wirelessly transmit the message.

9. The vehicle system of claim 1, wherein the message includes a vehicle location.

10. The vehicle system of claim 1, wherein the message includes a vehicle identifier.

11. A vehicle system comprising:
an engine block heater configured to heat a vehicle engine while the vehicle engine is not running;
a sensor configured to measure an engine block heating characteristic, associated with the engine block heater, while the vehicle engine is not running;
a processing device programmed to determine an operating state of the engine block heater based on the engine block heating characteristic measured; and
a communication device programmed to wirelessly transmit, while the vehicle engine is not running, a message including the operating state of the engine block heater.

12. The vehicle system of claim 11, wherein the engine block heating characteristic includes at least one of an engine oil temperature, whether the engine block heater is receiving power from a power source, an engine block temperature, and an engine coolant temperature.

13. The vehicle system of claim 11, wherein the processing device is programmed to determine the operating state of the engine block heater based on a plurality of engine block heating characteristics.

14. The vehicle system of claim 11, wherein the processing device is programmed to determine the operating state of the engine block heater based on how the engine block heating characteristic changes over time.

15. The vehicle system of claim 11, wherein the message includes at least one of a vehicle location and a vehicle identifier.

16. A method comprising:
measuring an engine block heating characteristic, associated with an engine block heater, while a vehicle engine is not running;
determining an operating state of the engine block heater;
generating a message including the operating state of the engine block heater; and
wirelessly transmitting the message while the vehicle engine is not running.

17. The method of claim 16, wherein the engine block heating characteristic includes at least one of an engine oil temperature, whether the engine block heater is receiving power from a power source, an engine block temperature, and an engine coolant temperature.

18. The method of claim 16, wherein the operating state of the engine block heater is determined from a plurality of engine block heating characteristics.

19. The method of claim 16, wherein the operating state of the engine block heater is based on how the engine block heating characteristic changes over time.

20. The method of claim 16, wherein the message includes at least one of a vehicle location and a vehicle identifier.

\* \* \* \* \*